United States Patent [19]

Karam, II

[11] Patent Number: 5,408,372
[45] Date of Patent: Apr. 18, 1995

[54] TRANSDUCER SUSPENSION DAMPING VIA MICROSTIFFENING

[76] Inventor: Raymond M. Karam, II, 620 E. Alamar, Santa Barbara, Calif. 93101

[21] Appl. No.: 989,974

[22] Filed: Dec. 11, 1992

Related U.S. Application Data

[63] Continuation of Ser. No. 579,479, Sep. 7, 1990, abandoned.

[51] Int. Cl.⁶ .............................................. G11B 5/48
[52] U.S. Cl. .................................................. 360/104
[58] Field of Search .................... 360/104, 103–106

[56] References Cited

U.S. PATENT DOCUMENTS

| | | | |
|---|---|---|---|
| 3,713,121 | 1/1973 | Fasano et al. | 340/174.1 |
| 3,786,457 | 1/1974 | Kahn | 340/174.1 |
| 3,931,641 | 1/1976 | Watrous | 360/104 |
| 4,107,748 | 8/1978 | Ho | 360/104 |
| 4,167,765 | 9/1979 | Watrous | 360/103 |
| 4,175,275 | 11/1979 | Schaefer | 360/104 |
| 4,286,297 | 8/1981 | Root et al. | 360/103 |
| 4,379,315 | 4/1983 | Schuler | 360/105 |
| 4,399,476 | 8/1983 | King | 360/104 |
| 4,408,238 | 10/1983 | Hearn | 360/104 |
| 4,760,478 | 7/1988 | Pal et al. | 360/104 |
| 4,786,999 | 11/1988 | Tanaka et al. | 360/104 |
| 4,797,763 | 1/1989 | Levy et al. | 360/104 |
| 4,819,094 | 4/1989 | Oberg | 360/104 |
| 4,829,395 | 5/1989 | Coon et al. | 360/104 |
| 4,853,811 | 8/1989 | Brooks, Jr. et al. | 360/103 |
| 4,853,812 | 8/1989 | Dalto et al. | 360/104 |
| 4,853,813 | 8/1989 | Yamanouchi | 360/104 |
| 4,855,851 | 8/1989 | Radwan et al. | 360/104 |
| 4,881,139 | 11/1989 | Hazebrouck | 360/105 |
| 4,884,154 | 11/1989 | Onodera et al. | 360/104 |

FOREIGN PATENT DOCUMENTS

| | | |
|---|---|---|
| 0025826 | 4/1981 | European Pat. Off. . |
| 54-76220 | 6/1979 | Japan . |
| 55-70973 | 5/1980 | Japan . |
| 56-34169 | 4/1981 | Japan . |
| 58-68274 | 4/1983 | Japan . |
| 59-193581 | 11/1984 | Japan . |
| 60-50777 | 3/1985 | Japan . |
| 60-57584 | 4/1985 | Japan . |
| 60-226080 | 11/1985 | Japan .................................. 360/104 |
| 61-144783 | 7/1986 | Japan . |
| 63-144475 | 6/1988 | Japan .................................. 360/104 |
| 63-234470 | 9/1988 | Japan .................................. 360/104 |
| 1-248372 | 10/1989 | Japan .................................. 360/104 |

OTHER PUBLICATIONS

Dick Henze, Ray Karam, and Albert Jeans, "Effects of Constrained–Layer Damping on the Dynamics of a Type 4 In–Line Head Suspension," *1990 Digests of the Intermag Conference*, Apr. 17–20.

Karam II, Raymond M., "Dynamic Analysis of The Magnetic Read/Write Head Suspension Using Laser Doppler Vibrometry and Base Excitation"—100 pages.

*Primary Examiner*—A. J. Heinz
*Assistant Examiner*—Jefferson Evans

[57] ABSTRACT

Micro-stiffening controls resonance in manufactured devices by reducing the amplitude of resonant vibration due to specific system dependent resonant frequencies. One specific use of the present invention relates to magnetic recording head suspensions wherein the reduction in amplitude, or damping, of detrimental resonant frequencies is achieved by micro-stiffening of specific areas of the suspension. By micro-stiffening the metal of the magnetic head suspension the amplitude of resonant oscillations is reduced at its origin. Thus, resonant oscillations no longer propagate along the entire length of the suspension. The magnetic head does not modulate significantly, resulting in alleviation of the detrimental effects of resonant oscillation on magnetic recording including cross-track error and head to disk spacing modulations.

19 Claims, 10 Drawing Sheets

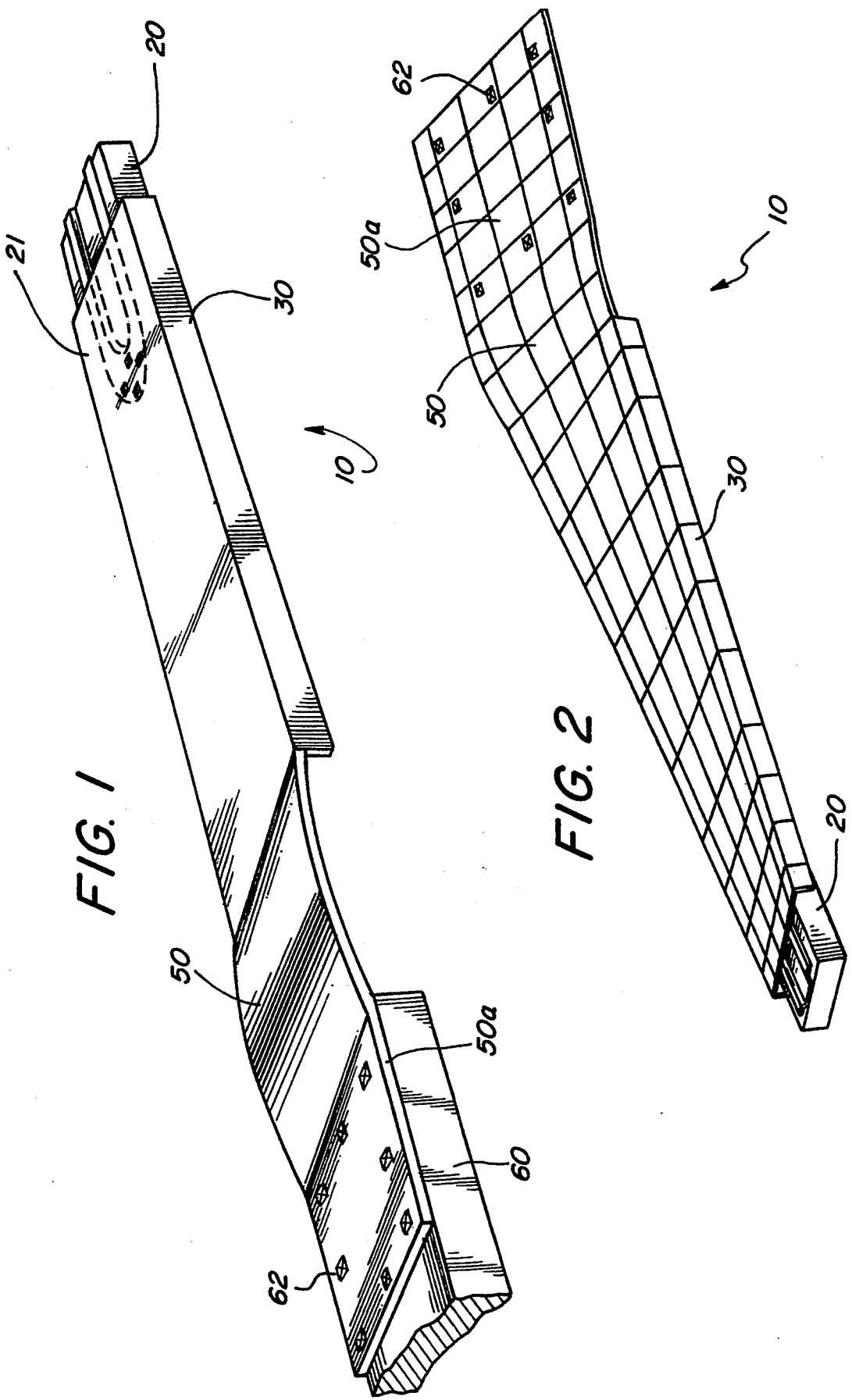

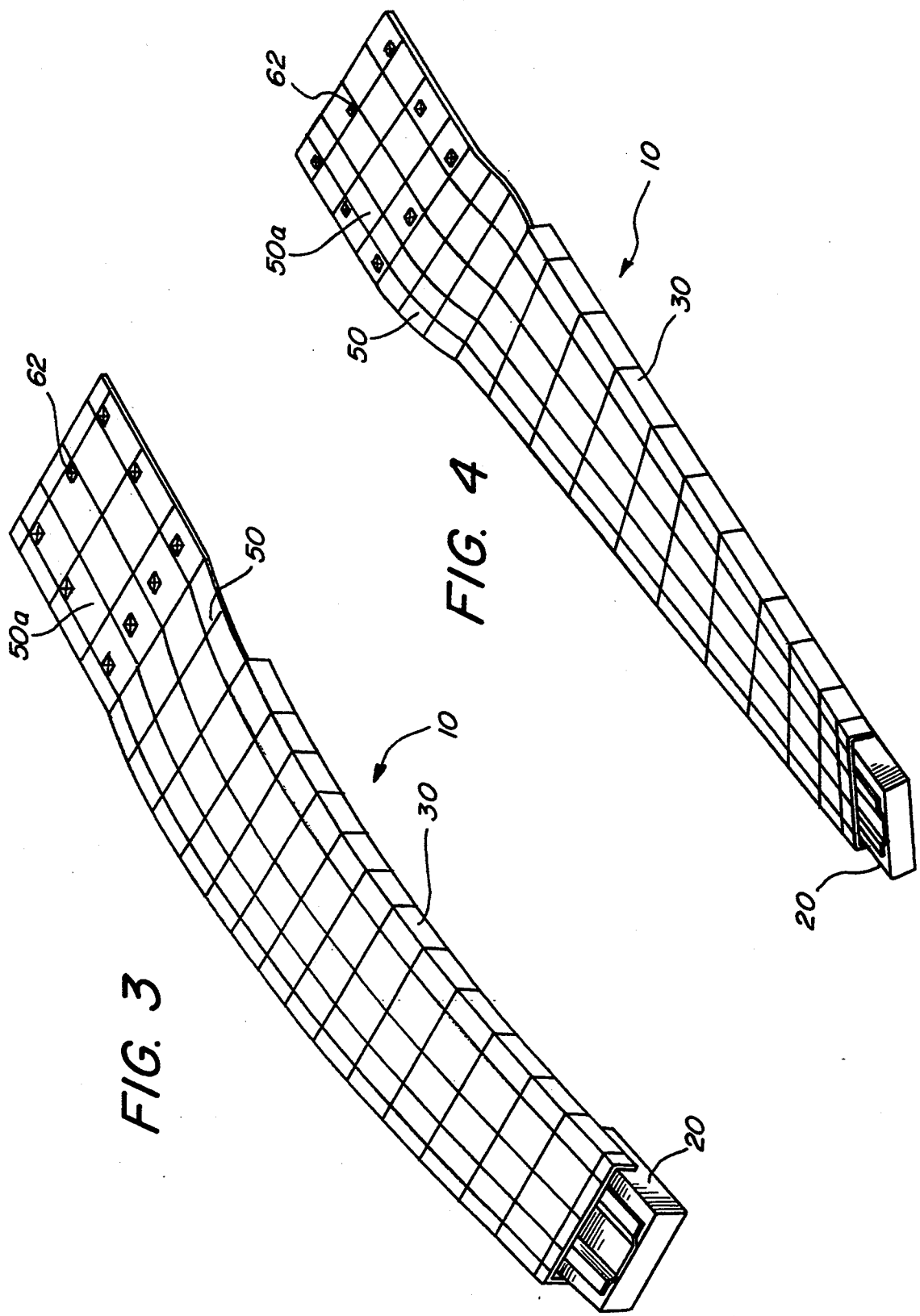

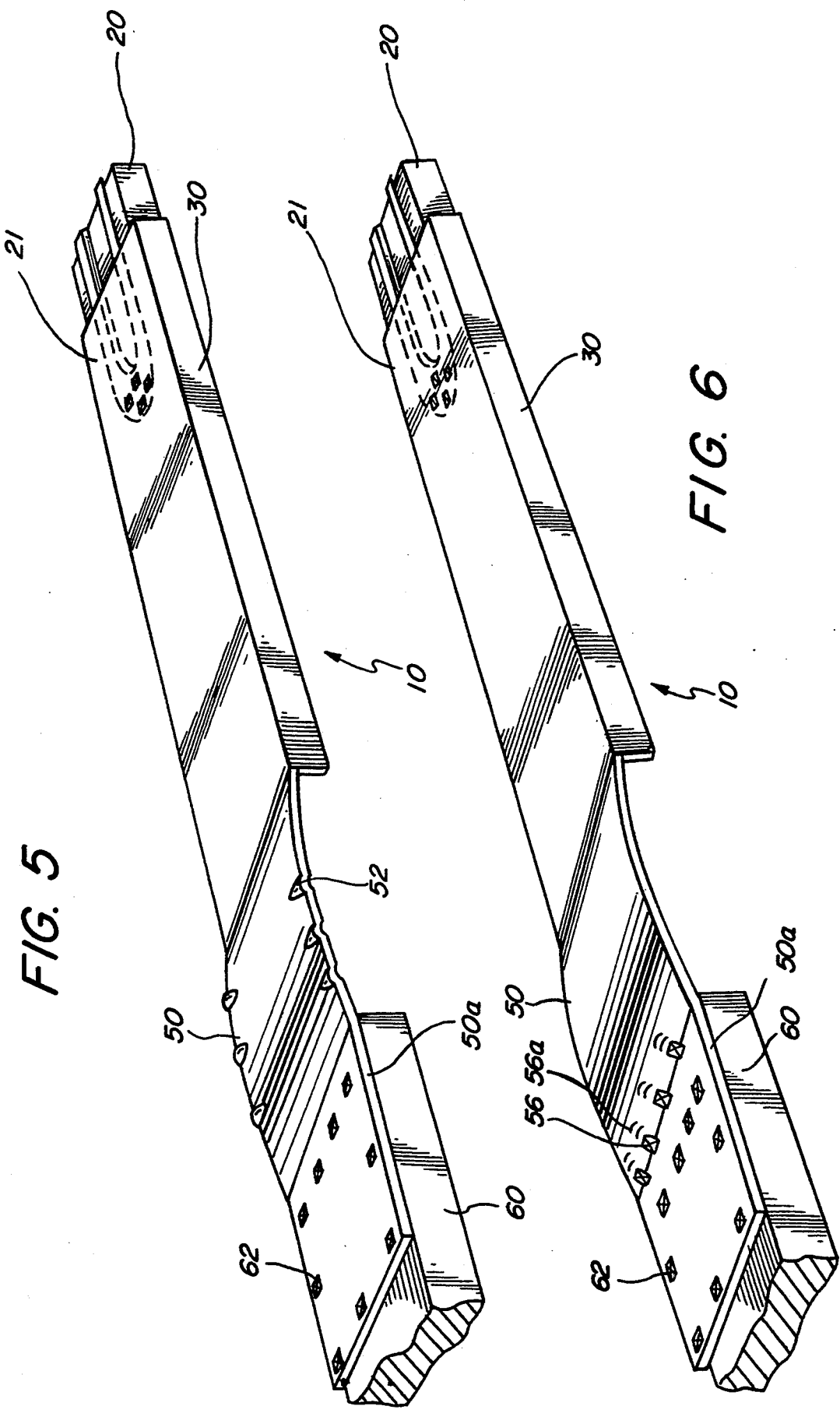

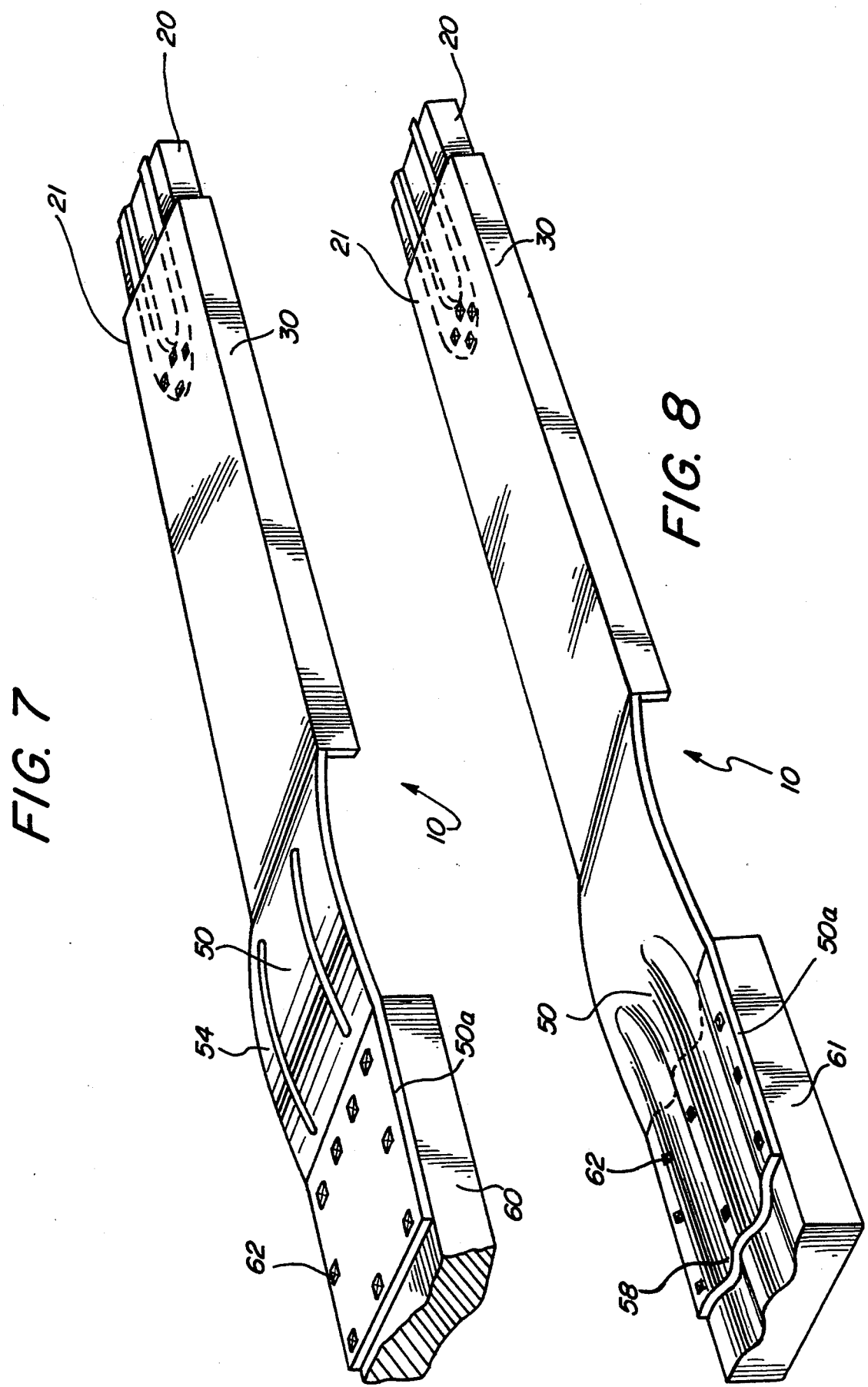

| MODE SHAPE | LOCATION |
|---|---|
| 1st BENDING | FORMED AREA |
| 1st TORSION | FORMED AREA |
| LUMPED | INTERFACE |
| 2nd BENDING | LOAD BEAM |
| 2nd TORSION | LOAD BEAM |

TRANSDUCER SUSPENSION DAMPING VIA MICROSTIFFENING

This application is a continuation of application Ser. No. 07/579,479, filed Sep. 7, 1990, now abandoned.

FIELD OF THE INVENTION

The present invention relates to controlling resonance in manufactured devices More specifically the present invention relates to the reduction in the amplitude of resonant vibration due to specific system dependent resonant frequencies using micro-stiffening of the formed device. One specific use of the present invention relates to magnetic recording head suspensions wherein the reduction in amplitude, or damping, of detrimental resonant frequencies is achieved by micro-stiffening of a particular area of the suspension.

BACKGROUND OF THE INVENTION

Magnetic recording heads typically comprise a transducer and a slider. These are supported in proximity to a magnetic recording medium, usually a spinning disk with a magnetic coating, by a suspension assembly. The suspension comprises a load beam that attaches to the slider and read/write transducer assembly via a flexible gimbal device at one end and a flexible section of the suspension, namely the formed area, at the other end. The formed area in turn is connected to a suspension support arm. The suspension support arm connects to an actuator. It is desirable for the transducer suspension to be flexible in a direction perpendicular to the plane of the disk so that the suspension is able to follow any movement of the head due to disk run out, or wobbling of the disk normal to its plane. If the transducer does not follow the out of plane motion of the disk, head to disk spacing variations will result. Additionally, the suspension should be extremely rigid in a plane parallel to that of the disk so the transducer can be accurately placed over a data track. The slider and the magnetic element are positioned over the proper track of data by a voice-coil powered actuator in order to read, write, and erase data.

Data is transferred to a magnetic recording medium in the form of magnetic flux reversals from a gap in the transducer. Recently, advances have been made that allow very high densities of data to be stored on a single disk. For accurate and dense data encoding, the read/write gap in the transducer must be maintained as close to the disk as possible at a constant height; typically about 6 micro-inches above the disk. The storage capacity of the disk is a strong function of the height of the read/write gap above the disk, i.e., the flying height. Storage capacity is also a function of the track density, i.e., the number of recording tracks available radially. This is determined by the accuracy with which the actuator motor can locate the transducer over a previously written track of data and follow that track as the disk spins. Therefore, the storage capacity of the disk is measured by the number of flux reversals per square inch. More precisely, the area density is calculated by the linear bit density, or the number of flux reversals per inch along a track, times the radial track density, or the number of tracks available radially. Typically the linear bit density is an order of magnitude greater than the radial track density. The number of flux reversals per inch is extremely sensitive to the head to disk interface spacing; one micro-inch of flying height variation significantly reduces the number of flux reversals per inch. Hence, it is very important to keep the head to disk spacing as constant as possible.

Fluctuations in the flying height, most commonly caused by head oscillations due to suspension resonances, degrade the performance of the disk drive by increasing the length of flux reversals. This decreases the voltage, or amplitude, of the data pulse that is read by the transducer, thus decreasing the signal to noise ratio. Suspension resonances are generally excited in the suspension during data seek and track following operations. However, there are also other sources that can cause the suspension to resonate, including external disturbances. In order to maximize the capacity of disk drives, it is necessary to control the resonant behavior of the suspension such that the suspension does not cause the head to disk spacing to vary significantly when the actuator is active.

In the powered down state, the read/write transducer is held against the disk by a preload force provided by the formed area of the suspension. The formed area is a flat spring which has a zero load position in a plane below the disk, therefore, when the transducer is in the plane of the disk, the formed area forces the transducer to remain in contact with the disk. During operation, a boundary layer of air is carried along the surface of the rotating disk. This boundary layer is generated by viscous forces in the operating fluid (air). Since the transducer is a hydrodynamic air bearing, i.e., it has very flat, highly polished surfaces in contact with the disk, the viscous operating fluid gets trapped between the transducer and the disk and forces the head to fly above the disk when the disk is spinning. Ideally, the formed area of the suspension should provide a preload force that is equal, but opposite in direction, to the hydrodynamic forces generated by the transducer when the read/write element is flying at the design flying height. At the same time, the formed area must be compliant enough to allow for minor variations in the displacement of the read/write element while not changing the preload force on the transducer. That is, the formed area's spring constant, or force per displacement, should be very small such that the change in preload force varies only slightly as the head follows the run out in the disk and also during the drive assembly process.

One very significant factor which influences dynamic transducer flying height is magnetic recording head suspension resonance. There are other factors which affect the flying height of the transducer, however, these are quasi-static variations, i.e., variations which occur at one third the frequency of the first resonant mode of vibration of the system, and are not caused by the dynamic behavior of the suspension. During suspension resonance, the transducer element is forced to modulate, causing a significant decrease in the signal to noise ratio of the system, as well as other detrimental phenomena previously mentioned. Another undesirable effect of suspension resonance is transducer off track error. That is, due to the geometry of the gimbal spring, which attaches the read/write element to the suspension, the transducer moves across tracks, leading to error in positioning the magnetic recording head. This behavior not only reduces the track density, because wider tracks must be designed for in the event of cross-track error, but also interferes with the electronic data-track following capability of the feedback system. During suspension resonance, cross-track modulations of the transducer can be so extreme that the track following electronics, which control the actuator, can become confused causing the mechanical system to become unstable. Ultimately, actuator instability leads to violent oscillations of the transducer suspension, causing the head to contact the disk and possibly destroy the data.

Three types of vibrational modes that commonly appear in magnetic head suspension assemblies are bending modes, torsional modes, and a lumped-parameter mode. The bending and torsional modes are continuous system modes, i.e., modes which can best be modeled by an oscillating string. For example: The first bending mode, associated with a particular frequency, takes on a half-sine wave shape along the longitudinal axis of the suspension, while the second bending mode, associated with another frequency, takes on a full-sine wave shape, and so on. Similarly, the first torsional mode takes on one full twist along the longitudinal center line of the suspension at one frequency, while the second torsional mode takes on two full twists down the center line of the suspension at a different frequency and so on. While the bending and torsional modes have many harmonics, the lumped parameter mode only exists at one frequency in the system. This is due to the discrete nature of the suspension head assembly during this mode of vibration; the entire suspension appears to be a single oscillatory spring while the transducer acts as a single lumped mass. Therefore, this mode behaves as a simple discrete spring/mass system, having only one mode of resonance, occurring at one frequency.

The bending modes of vibration cause the transducer to be displaced in the data track direction, i.e. along the track. Also, the bending modes cause the head to disk spacing, or flying height, to modulate at the resonant frequency. As previously discussed, flying height modulation causes many undesirable phenomena to occur. The torsional modes of vibration cause the transducer to modulate in the cross-track direction, causing data tracking errors. Such errors inhibit the control system from accurately placing the head over a data track, thereby interfering with the operation of the device. The lumped parameter mode also causes the head to modulate in the cross-track direction, but with much greater amplitude than that of the torsional modes. None of the detrimental effects caused by these modes is tolerable in disk drives designed for high density recording.

Often, the vibrational modes are initiated by activating the actuator motor. The actuator uses a closed loop feedback system to locate the suspension, and hence the slider, over the proper track of data. The closed loop feedback system can utilize either a dedicated disk containing only position information to control the location of the actuator, or feedback information can be embedded in each disk such that the transducer in use feeds back position information to the actuator to control an individual head on a particular disk on demand. Position information, either from a dedicated or embedded source, is fed back to the actuator control system. This information forces the data head(s) to remain on track while reading and writing information. In many systems, the actuator control system uses a voice-coil motor to drive the suspension and slider over the disk. When it is desired to position the head at a specific location, the motor is driven by a voltage that has a very short rise time, such that the actuator is accelerated very quickly. Once the actuator is in motion, the voltage levels off and the actuator approaches a constant velocity. As the actuator approaches the proper location on the disk, a similar, but inverse voltage pattern is applied to the voice-coil motor to stop the suspension actuator. Both the voltage rise, to start the actuator, and the voltage drop, to stop the actuator, are best represented by a square wave. Fourier analysis, or frequency domain analysis, of this full square wave reveals that it is made up of a multitude of sinusoids at different frequencies. Thus, movement of the actuator can excite all vibrational modes of the suspension and as a result, cause a combination of modes to be excited at one time. Hence, the suspension must be very well behaved from a dynamic point of view, otherwise, the storage capacity and performance of the disk drive will be seriously reduced.

In summary, the dominant resonant oscillation modes which can adversely affect the suspension are: bending modes, torsional modes, and the lumped parameter mode. The bending modes cause the slider to move normal to the plane of the disk, resulting in variable size data flux reversals and the increased likelihood that the head will contact the disk. The torsional modes and the lumped parameter mode can cause the slider to modulate across the data tracks, i.e., in the cross-track direction of the disk, causing positioning error. As discussed above, any suspension motion which causes the head to modulate in or out of the plane of the disk reduces the information storage and retrieval capacity of the disk drive.

A traditional approach used to overcome problems associated with resonant vibration in the suspension system is to add a constraint layer damper. The constraint layer damper is a thin visco-elastic polymer that is affixed to the load beam to absorb oscillatory mechanical energy in the suspension. As the name suggests, visco-elastic materials possess both viscous and elastic properties. Visco-elastic material is best modeled by a coil spring with a viscous fluid damper in its center. When the spring traverses a displacement, energy is absorbed by the working fluid in the damper passing from one chamber to another through an orifice. When the force which caused the displacement is removed, the spring returns the system to its original state. Although the constraint layer damper functions on the same principle, energy is not lost through compression or expansion of the damper, but rather shear, or parallel relative motion of planes of the material.

Visco-elastic dampers are manufactured by sandwiching a sheet of visco-elastic material between one steel constraining layer which is cut to the proper shape and the object to be damped. Visco-elastic material is inherently sticky, giving an intrinsic adhesive backing. Use of an adhesive backed visco-elastic material in a production environment requires additional handling of the suspension and therefore, additional expense. Other difficulties exist as well, including contamination, damper placement variability, damping temperature dependance, and the necessity for additional thermal cycling. Contamination is due to the fact that visco-elastic materials attract dust and other microscopic particles, which can be released into the disk drive. Damper placement on the suspension must be carefully controlled to insure the visco-elastic material is located in the correct area of the suspension. The visco-elastic properties of the damper also vary with temperature. At high temperature, the constraint layer damper looses its damping qualities, allowing too much vibration in the suspension, while at low temperature the damper becomes extremely elastic and hence is unable to damp oscillation. Additionally, the damper requires further handling in that it necessitates thermal cycling to relax the visco-elastic material such that it conforms to the shape of the preloaded suspension. This is the only way to insure that the damper does not cause an off tracking error due to the damper relaxing when the drive operates for the first time. Finally, the change in the properties of the damper as it ages is not well understood.

SUMMARY OF THE INVENTION

The present invention comprises a magnetic head suspension incorporating micro-stiffening for reduction of the amplitude of resonant oscillation at the head. Micro-stiffening absorbs energy at the source of resonant oscillations such that the suspension resonances are not transmitted to the head.

In accordance with the present invention a magnetic head suspension assembly is disclosed comprising a means for micro-stiffening, wherein the micro-stiffening means reduces the amplitude of an oscillation mode of the suspension without significantly shifting the frequency of the oscillation mode. In one embodiment, means for micro-stiffening comprises plastic deformation of a localized region of said suspension assembly for this magnetic head suspension assembly. This means may further comprise a micro-stiffened load beam section and/or a micro-stiffened formed area. Additionally, the means for micro-stiffening may comprise an interface region wherein the load beam section is connected to a formed area and this interface region is micro-stiffened.

In another embodiment, the present invention provides a magnetic head suspension assembly comprising a means for micro-stiffening, wherein the micro-stiffening means increases the dynamic stiffness of the suspension and reduces the amplitude of an oscillation mode of the suspension without significantly shifting the frequency of the oscillation mode. The magnetic head suspension assembly may further comprise a means for micro-stiffening including plastic deformation of a localized region of said suspension assembly. The means for micro-stiffening may further comprise a micro-stiffened load beam section and/or a micro-stiffened formed area. Additionally, the magnetic head suspension assembly may further comprise a load beam section connected to a formed area at an interface region wherein said interface region is micro-stiffened.

In one aspect of the invention, a magnetic head suspension assembly is disclosed comprising a means for micro-stiffening, wherein the micro-stiffening means increases the effective stiffness of the suspension when the suspension resonates without significantly altering the overall nonresonant stiffness of the suspension.

In another aspect of the invention, a magnetic head suspension assembly is disclosed comprising a load beam section and a flexible section which has a preferred direction of flexure, said flexible section further including a stiffening means which increases the rigidity of the suspension along the preferred direction of stiffness. In one embodiment, the stiffening means for the magnetic head suspension assembly may comprise a formed contour.

In yet another aspect of the present invention, the magnetic head suspension assembly comprises a load beam section and a flexible section, wherein this flexible section further includes a crease which has a component along a longitudinal axis of the suspension. The crease in the flexible section may comprise a plastic deformation of said flexible section.

Another embodiment of the present invention includes a magnetic head suspension assembly comprising a load beam section and a flexible section, said flexible section further including a ridge which has a component along a longitudinal axis of the suspension. The flexible section may further comprise a ridge, as described above, formed elastically.

Yet another embodiment of the present invention discloses a magnetic head suspension assembly comprising a load beam section and a flexible section, wherein the flexible section further includes a crimp along an edge of the flexible section.

The present invention also provides for a magnetic head suspension assembly comprising a load beam section and a flexible section, wherein the flexible section further includes a dimple having a component along a longitudinal axis of said suspension.

Additionally, the present invention discloses a magnetic head suspension assembly comprising a load beam section and a flexible section wherein the flexible section is shot peened to increase its rigidity along a longitudinal axis of the suspension.

Another form of the present invention is a magnetic head suspension assembly comprising a load beam section and a flexible section, wherein the flexible section further includes a flap having a crease and folds to increase the rigidity of the suspension along a longitudinal axis of the suspension.

Still another form of the present invention is a magnetic head suspension assembly comprising a load beam section and a flexible section joined by a transition region, wherein the transition region includes a distortion having a component along a longitudinal axis of the suspension.

Another embodiment of the present invention is disclosed as a magnetic head suspension assembly comprising a load beam section and a flexible section joined by a transition region, wherein the load beam section includes a longitudinal micro-distortion, a lateral micro-distortion and a diagonal micro-distortion. This embodiment may further comprise a longitudinal micro-distortion in said transition region and a longitudinal micro-distortion in said flexible section. Additionally the longitudinal micro-distortion in the flexible section may further comprise a flap along an edge of the flexible section.

The present invention also comprises a method of suppressing the amplitude of an oscillation of a magnetic head suspension assembly without significantly changing the frequency of the oscillation comprising the step of micro-stiffening the suspension.

The present invention further provides a method of manufacturing a magnetic head suspension assembly comprising the step of forming longitudinal micro-distortions in a portion of the suspension. This method may further comprise the step of pressing a portion of the suspension between a male and a female die to form the longitudinal micro-distortions in a flexible section of the suspension. This method may additionally comprise the step of pressing a portion of said suspension between a male and a female die to form the longitudinal micro-distortions in a load beam section of the suspension. Further, the method may comprise the step of spot welding a portion of the suspension to form dimples in a flexible section of the suspension. The method may also comprise the step of crimping a portion of said suspension.

BRIEF DESCRIPTION OF THE DRAWINGS

FIG. 1 shows a suspension assembly for a magnetic recording head.

FIG. 2 shows a gridline plot of a suspension in a first torsional mode.

FIG. 3 shows a gridline plot of a suspension in a first bending mode.

FIG. 4 shows a gridline plot of a suspension in a lumped parameter mode.

FIG. 5 shows a suspension with micro-stiffening formed by crimping the formed area with tweezers. The stiffening is designed to stop first torsional mode.

FIG. 6 shows a suspension with micro-stiffening formed by spot welding the base of the formed area to cause rippling. The stiffening is designed to stop the first torsional mode.

FIG. 7 shows a suspension with micro-stiffening formed by stamping the formed area to form a ridge. The stiffening is designed to stop the first torsional mode and the first bending mode.

FIG. 8 shows a suspension with micro-stiffening formed elastically by pressing a portion of the formed area into a corrugated suspension support arm. The stiffening is designed to stop the first torsional mode and the first bending mode.

DETAILED DESCRIPTION OF THE INVENTION

Figure 9:
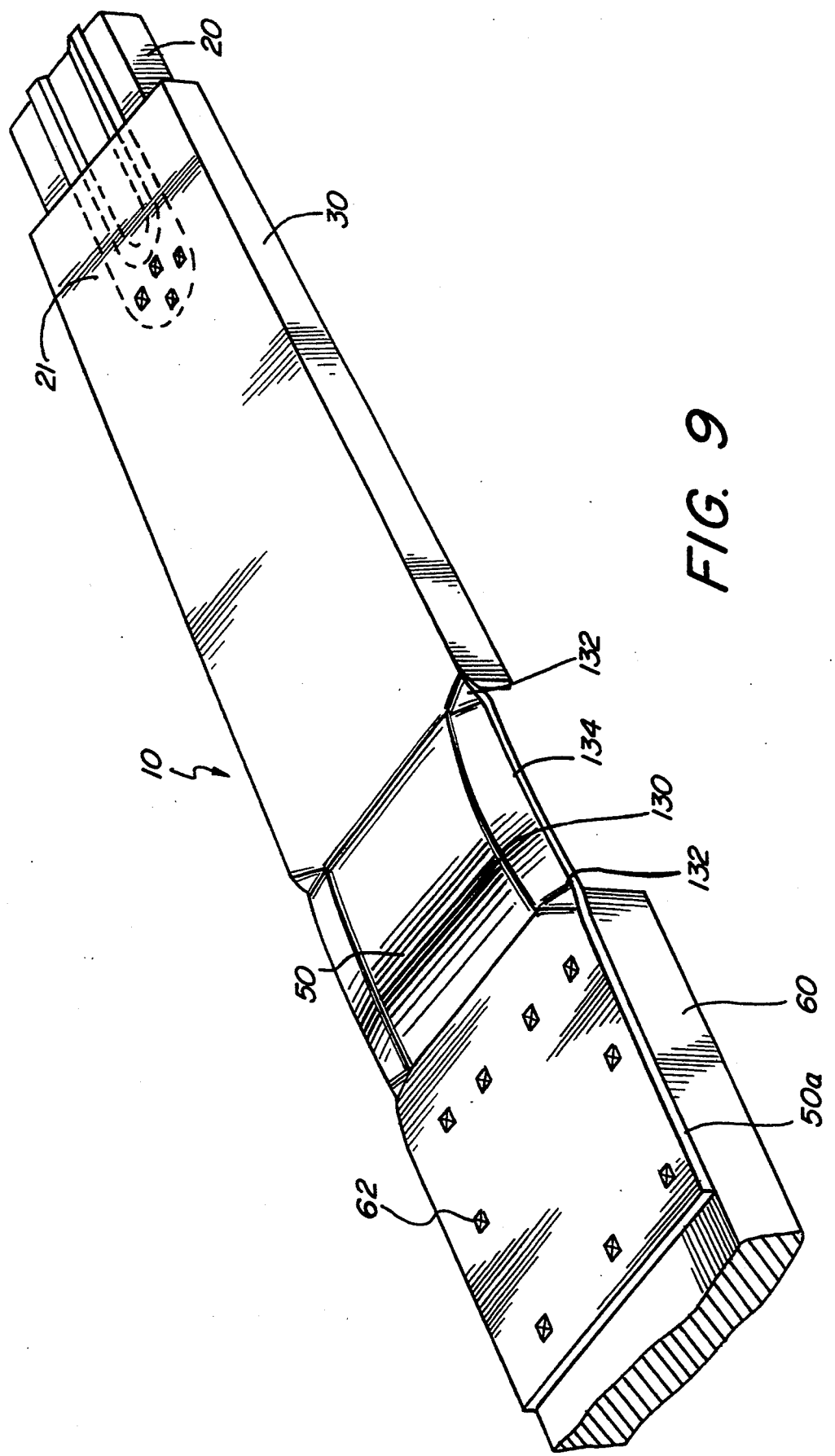
FIG. 9 shows a suspension with micro-stiffening in the formed area to reduce the amplitude of vibration of the first bending and first torsional modes.

FIG. 1 shows a reverse rib suspension 10 for a magnetic recording head. A slider 20 is mounted at one end of a load beam 30. At the other end of the load beam 30 is a formed area 50 that opposes the lifting force of an air bearing formed between the slider 20 and the disk (not shown). An extension 50a of the formed area is spot welded 62 to a suspension support arm 60. The suspension support arm 60 is in turn connected to a servo controlled voice-coil actuator (not shown).

Resonant oscillations in the suspension can be excited by actuation of the voice-coil motor during positioning of the slider above a desired track on the disk. The cycle of the motor includes a relatively short rise time, or turn on time, to achieve a desired velocity, a constant velocity portion, and a relatively short fall time, or turn off time. The complete cycle approximates a square wave. As is well known in Fourier analysis, square waves are a combination of a multitude of sinusoids comprising many different frequencies. Thus, movement of the actuator can introduce broad bandwidth sinusoidal excitation into the suspension, some of which will excite resonant oscillations in the slider suspension. Suspension oscillation results in vibration of the attached slider. This in turn results in variation in position above the disk's surface of the transducer, and finally, of the transducer's data transmitting gap. High density recording requires this gap to be as close as possible to the disk while remaining at constant height. Vibration in the suspension prevents this requirement from being met.

Resonant oscillation occurs when an un-damped system is driven at a particular frequency which is near a harmonic, or multiple, of a natural frequency of oscillation of the system. The natural frequencies of a system are the frequencies where a small input oscillation will cause the system to vibrate with a large amplitude. Resonant oscillations affect the performance of magnetic head suspension assemblies in three modes: bending, torsional, and lumped parameter. Bending and torsional modes have many different harmonics that affect the suspension in similar ways at different frequencies. The lumped parameter mode only has one frequency of resonance since it is best modeled by a discrete single degree of freedom system. Illustrations of the first torsional and bending modes of the suspension are shown in gridline plots in FIGS. 2 and 3, respectively. The lumped parameter mode is shown in FIG. 4. The bending mode results in variation of the area of the disk's surface covered by the field transmitted from the transducer gap. This variation results in the flux reversals having non-uniform sizes, which substantially decreases the data density on the disk. The bending mode also increases the possibility of a catastrophic head crash. The torsional and lumped parameter modes cause cross-track errors. During these modes the magnetic head modulates above the desired recording track, making the transducer fly over multiple tracks of data during a single revolution of the disk. This causes control system instability, wherein the control system cannot accurately place the slider above the desired track. The torsional mode causes the suspension to twist about its longitudinal axis, in turn causing the transducer to rotate about an axis normal to the plane of the disk but with a center of rotation not coincident with the geometric center of the head. Hence, cross-track motion results during torsional resonance. Optimal high density data recording cannot be achieved under these conditions.

Micro-stiffening of the suspension can be used to overcome these conditions. FIGS. 5 through 12 show a reverse rib suspension incorporating several different embodiments of the present invention. In all of these embodiments, the suspension is typically made of non-magnetic stainless steel, number 302, cold rolled to a yield strength of 186,000 pounds per square inch. In each of FIGS. 5 through 12, the slider 20 is attached to the load beam 30 via a gimbal spring at one end. At the other end there is a formed area 50, having an extension 50a that is spot welded 62 to the suspension support arm 60 (or corrugated base plate 61 in FIG. 8) of the actuator. Micro-stiffening is incorporated into the load beam 30 and/or formed area 50.

Micro-stiffening is achieved by placing small distortions in the metal of the suspension 10. Micro-stiffening thus provides localized stiffening which increases the dynamic stiffness, or rigidity of the part when oscillating at a frequency at or greater than the frequency of the first resonant mode. However, it only slightly affects the quasi-static stiffness, or rigidity of the part when oscillating at a frequency less than one-third the frequency of the first resonant mode. Hence, it diminishes the amplitude of a problem causing resonant oscillation until it is no longer of consequence. Micro-stiffening can be formed in the metal in numerous ways. FIG. 5 shows the formed area 50 micro-stiffened by crimps 52 formed in the metal with tweezers. FIG. 6 shows the formed area 50 micro-stiffened by spot welding 56, very near the formed area, the extension 50a that attaches to the suspension support arm 60. Spot welding 56 here causes dimpling 56a in the formed area as the metal is slightly heated near the weld without heating the metal further from the weld. The temperature gradient in the metal causes dimpling. FIG. 7 shows the formed area micro-stiffened by stamping the metal with a positive mandrel on one side and a negative mandrel on the other to create longitudinal creases 54 along the formed area 50. The creases 54 are formed by placing the part between a male and female forming die. The die is mated using a hydraulic press with a force of approximately 1000 to 4000 pounds such that the metal in between is distorted in the shape of the die. The crease made in this manner is then smoothed to insure the suspension has enough flexibility to conform to the motion of a disk normal to its plane, or disk run out, while it is spinning. Maximum lateral run out of a spinning disk is typically one thousandth of an inch or less. Additionally, the crease is smoothed to tolerate deviations in the disk to mounting plane of the suspension support arm 60 spacing, or z-height, during assembly of the drive. FIGS. 5, 6, and 7 are illustrative of a few of the ways the metal can be plastically, or irreversibly, deformed on a small scale. Each of these methods can be performed on various areas of the suspension. It has been determined that micro-stiffening should be approximately an order of magnitude greater than the expected maximum amplitude of resonance in order to be effective. That is, when 0.0002 inches of displacement is expected in the formed area 50 during the first torsional mode of resonance, the corresponding micro-stiffening should be about 0.002 inches in height to reduce the amplitude of resonance.

The metal can also be elastically deformed as shown in FIG. 8. Elastic deformation is effected into the part by external forces that leave no permanent contour in the material when the external forces are removed. One way this is accomplished is to lightly press the metal of the suspension 10 into the grooves of a corrugated mounting 61 such that ridges 58 are added. The depth of the grooves may be selected such that the ridges 58 will not remain when the restraining force imposed on the material is removed, i.e., the ridges are elastically formed in the metal.

The above examples represent but a small fraction of the many potential ways micro-stiffening can be implemented. Regardless of the specific means used, the effect is to make infinitesimal distortions in the metal of the suspension which add dynamic stiffening to the suspension such that the amplitude of resonance is reduced. Through micro-stiffening, an order of magnitude reduction in the amplitude of resonant oscillation is obtained without the usual associated increase in the frequency of the resonant mode. This is possible since the same mechanical energy is absorbed by the suspension while it traverses less displacement at resonance. In effect, the suspension appears to be damped since the amplitude of resonance has been significantly reduced. As with dampers placed in or on mechanical systems, micro-stiffening is added to the suspension at or near the point of origin of resonant oscillation modes to dampen that mode of oscillation. In reducing the amplitude of resonance, micro-stiffening increases the performance of the voice-coil motor control system. Hence, better performance can be achieved with a micro-stiffened suspension than can be achieved with a standard suspension.

Different resonant vibration modes originate at different locations on the suspension. Thus, it is desirable to locate the micro-stiffening at varying locations on the suspension, namely, at or near the origin of the resonant mode(s) to be damped.

Illustrated in FIG. 9 is a reverse rib suspension 10 with micro-stiffening added to the formed area 50 to reduce the amplitude of the first bending and first torsional modes. In this implementation of micro-stiffening these modes cannot be decoupled, hence micro-stiffening is added to manipulate these modes together. To obtain this design the edges of the formed area are placed in a mandrel which angles each edge downward, leaving a crease 130, from which extends a flap 134. The flap 134 is still connected to the load beam 30 and the extension 50a of the formed area. To do this, the metal at each connection must be stretched and folded 132 such that the flap 134 can be brought down. This procedure can be accomplished as described above using a male/female die combination and a hydraulic press.

Figure 10:
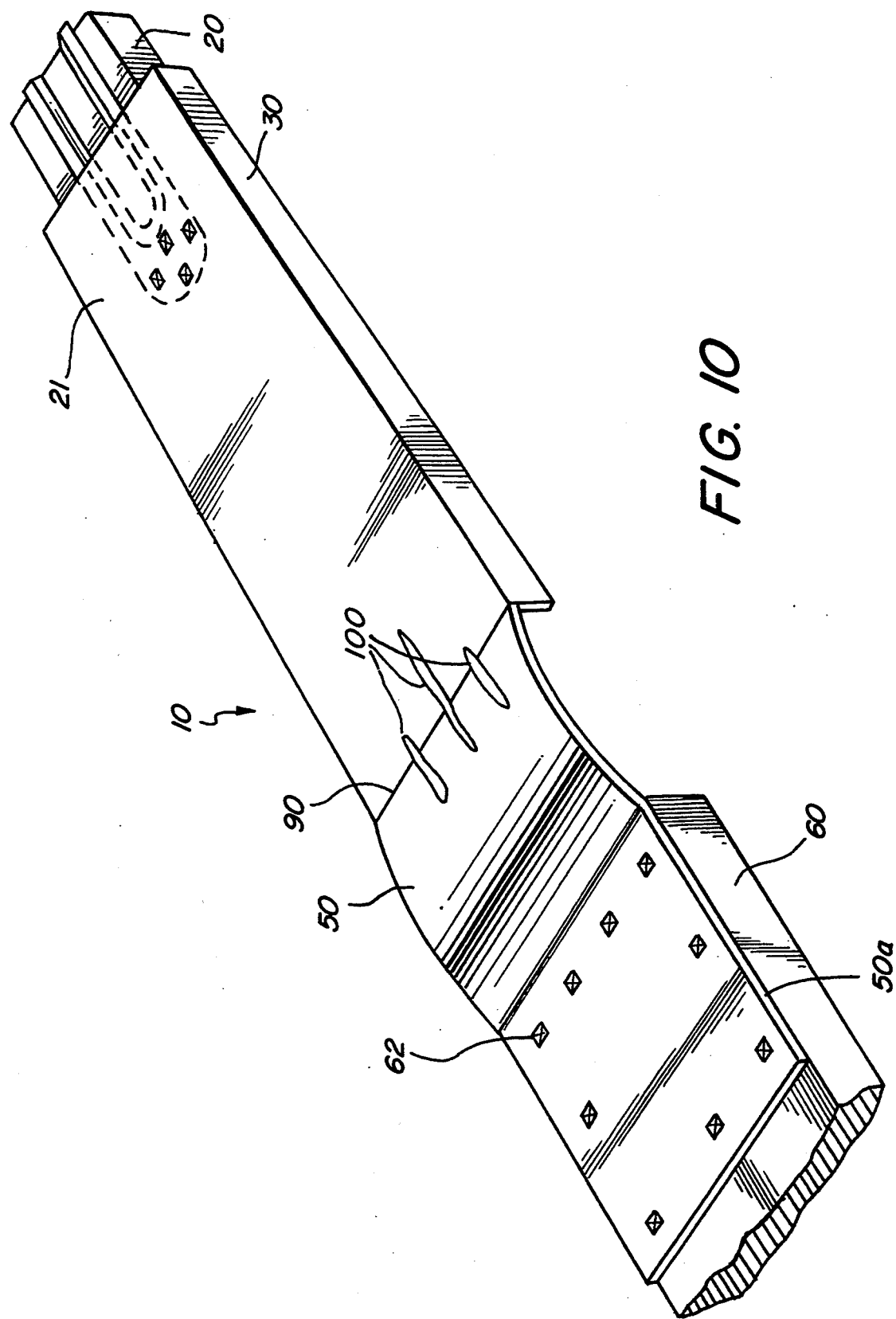
FIG. 10 shows a suspension with micro-stiffening at the interface between the formed area and the load beam to reduce the amplitude of vibration of the lumped parameter mode.

FIG. 10 shows micro-stiffening added to the interface 90 between the formed area 50 and the load beam 30 to reduce the amplitude of the lumped parameter mode. Again, a hydraulic press and die are used to form the micro-stiffening distortions in the metal. Three relatively short longitudinal distortions 100 are pressed into the metal of the interface 90 between the formed area 50 and the load beam 30. For the configuration of the suspension 10 shown, the distortion line in the center is longer than the outer two.

Figure 11:
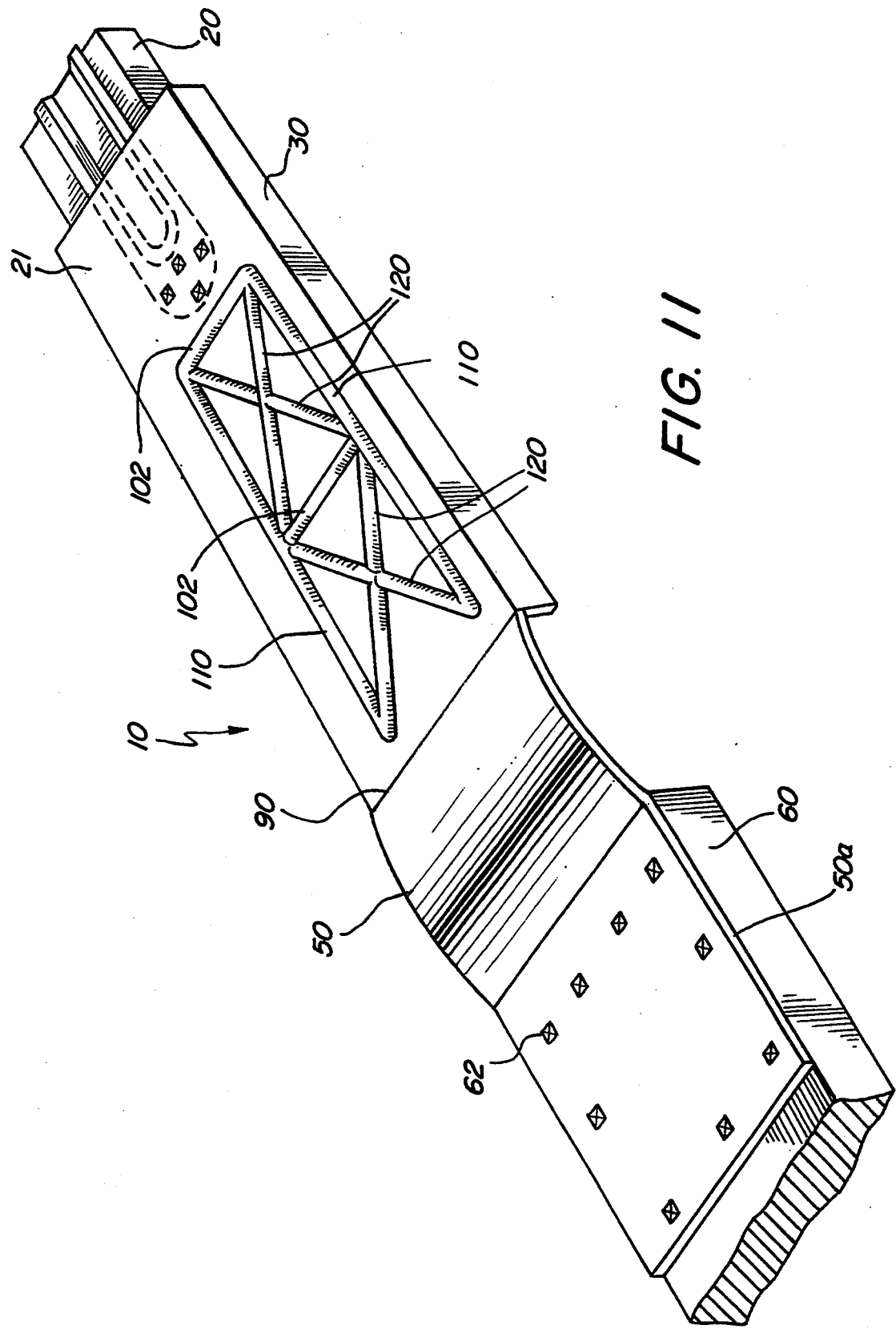
FIG. 11 shows a suspension with micro-stiffening on the load beam to reduce the amplitude of vibration of the second bending and second torsional modes.

FIG. 11 shows micro-stiffening, again pressed into the part with a hydraulic press and a male/female die combination, added to the load beam to reduce the second bending and second torsional modes. Analogous to the first bending and first torsional modes, the amplitude of these modes are reduced together. Longitudinal micro-stiffening distortions 110 are made along the length of the load beam 30. Lateral micro-stiffening distortions 102 are added such that the lateral and longitudinal distortions meet to form rectangular boxes. The lateral micro-stiffening distortions 102 serve to further diminish the second torsional mode without influencing the second bending mode. Micro-stiffening is further implemented along each diagonal 120 of each rectangle formed by the intersection of the longitudinal micro-stiffening distortions 110 and lateral micro-stiffening distortions 102. This diagonal micro-stiffening 120 serves to curtail both the second bending and second torsional modes.

Figures 12, 13:
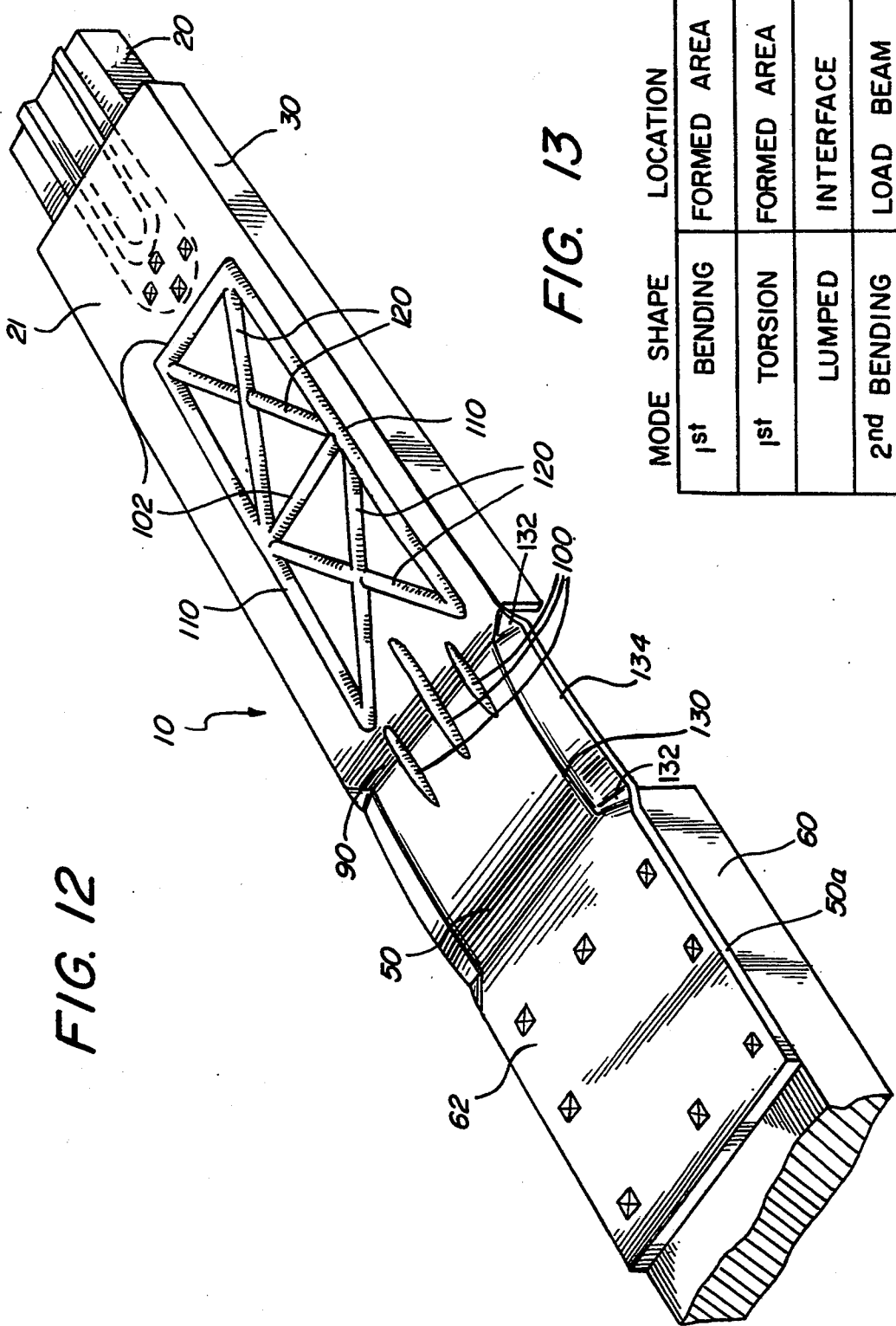
FIG. 12 shows a suspension with micro-stiffening in the formed area, on the load beam, and at their interface to reduce the amplitude of the first and second bending and torsional modes as well as the lumped parameter mode.
FIG. 13 is a chart of where to place micro-stiffening in order to reduce a desired mode.

Any combination of the micro-stiffening shown in FIGS. 9, 10, and 11 can be utilized on a single suspension, as needed, to reduce the amplitude of resonant vibration in a suspension 10. FIG. 12 shows a suspension incorporating each of the above discussed micro-stiffening distortions. This suspension is capable of damping the first bending and first torsional modes, the lumped parameter mode, and the second bending and second torsional modes. FIG. 13 supplies, in tabular form, information about where micro-stiffening can be placed to reduce the amplitude of oscillation of a given mode in a suspension of a design similar to that shown in the preceding figures.

Figure 14:
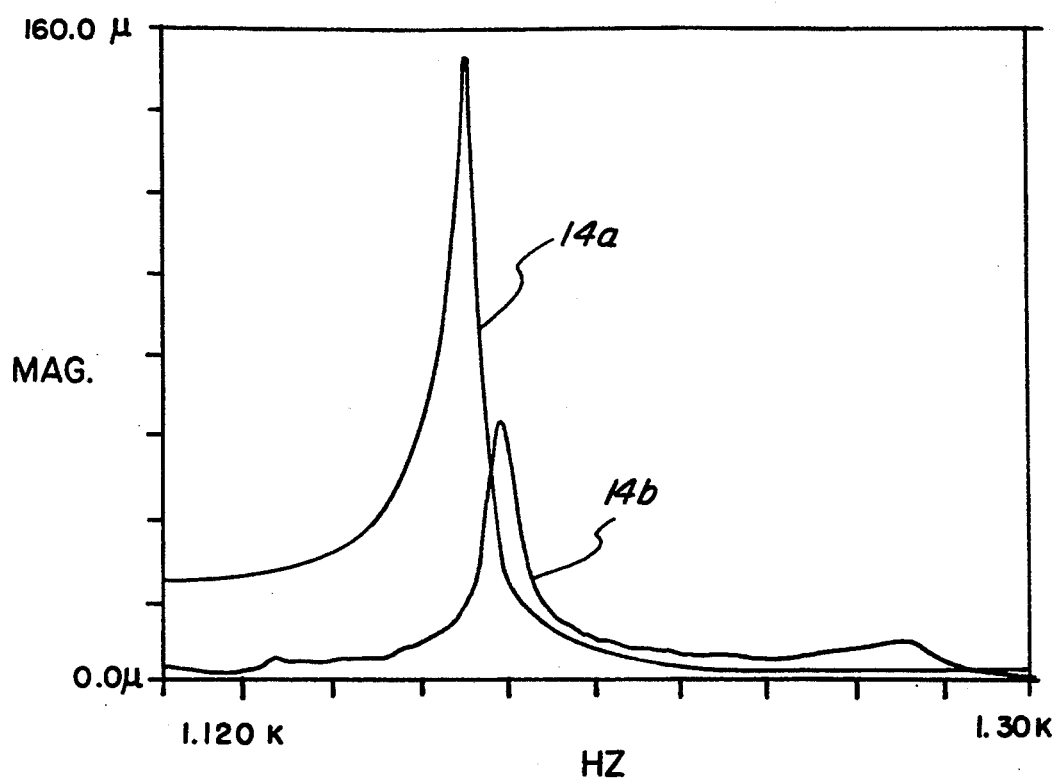
FIG. 14 shows a comparison of the frequency response function in the frequency range of the first torsional mode of a suspension both without (14a) and with (14b) micro-stiffening. The excitation is applied at the base in the lateral direction. The plot is formed by measuring the input acceleration at the base and dividing that value into the output displacement normal to the plane of the suspension. This measurement was taken at the interface between the formed area and the load beam.
Figure 15:
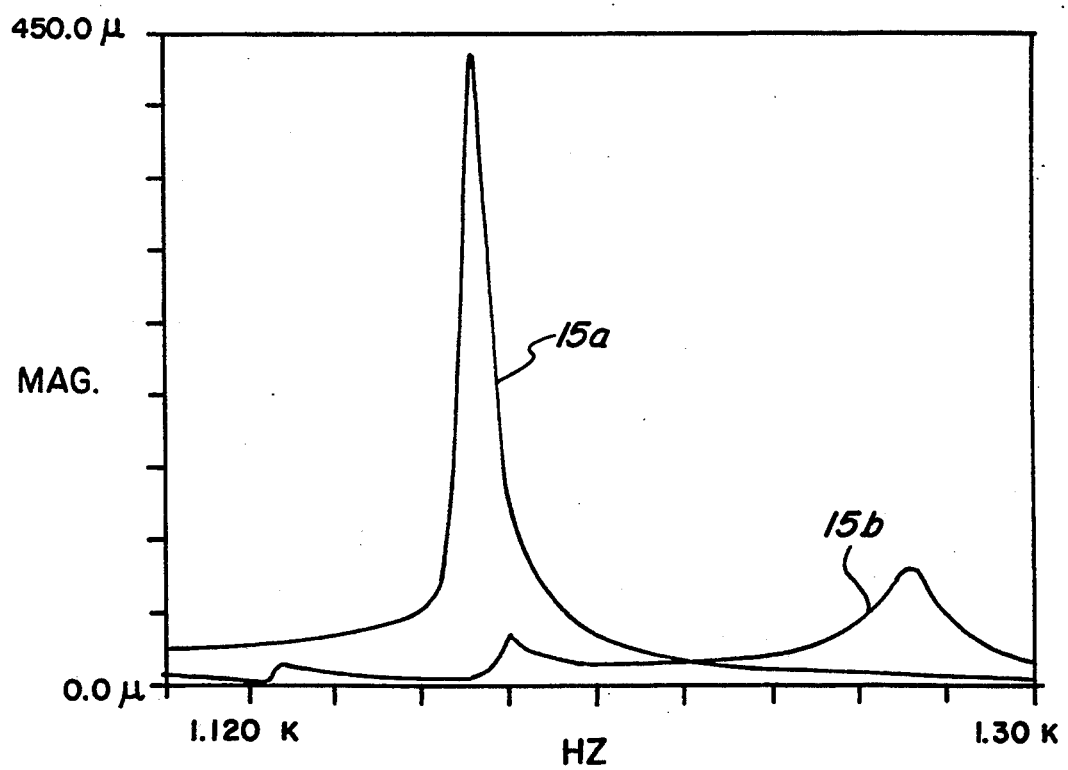
FIG. 15 shows a comparison of the frequency response function in the frequency range of the first torsional mode of a suspension both without (15a) and with (15b) micro-stiffening. The excitation is applied at the base in the lateral direction. The plot is formed by measuring the input acceleration at the base and dividing that value into the output displacement normal to the plane of the suspension. This measurement was taken at the slider end of the suspension.
Figure 16:
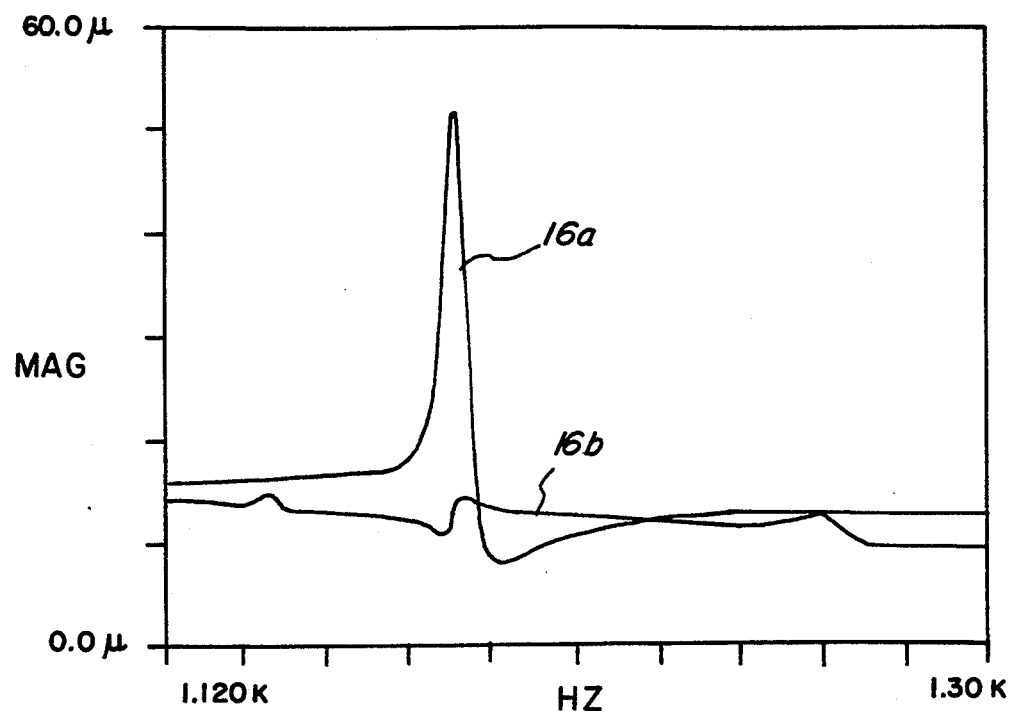
FIG. 16 shows a comparison of the frequency response function in the frequency range of the first torsional mode of a suspension both without (16a) and with (16b) micro-stiffening. The excitation is applied at the base in the lateral direction and the displacement data is measured at the slider in the lateral direction, i.e., in the direction of base excitation.

FIGS. 14 through 16 compare, over the frequency range of the first torsional mode, a reverse rib suspension both with and without micro-stiffening. For rotary actuators, the most widely used type of actuator, the first torsional mode is the most troublesome. Thus, only the effect of micro-stiffening on the first torsional mode will be discussed. The series of plots, FIGS. 14 through 16, illustrates how the first torsional mode affects the suspension and the effects of micro-stiffening to reduce the first torsional mode. One skilled in the art will realize that similar beneficial effects will occur for modes with different mode shapes, located at other frequencies.

FIG. 14 shows a frequency response function of a reverse rib suspension both with and without micro-stiffening. These data correspond to the suspension 10 shown in FIG. 1 for a suspension without micro-stiffening and the suspension 10 shown in FIG. 9 for a suspension with micro-stiffening. The plot is of frequency versus displacement normal to the plane of the disk, where the displacement is measured at the interface between the formed area and the load beam. One g (gravity) of base excitation over the frequency range of the first torsional mode is applied at the base, or suspension support arm 60, in the lateral direction. Curve 14a represents the suspension without micro-stiffening while curve 14b represents the suspension with micro-stiffening. In curve 14a, without micro-stiffening, there is a significant peak of approximately 130 micro-inches around 1200 Hz. This peak is indicative of the first torsional mode being excited in the suspension 10. Torsional motion at the base 60 of the suspension results in greater amplitude torsional motion at the head 21, or slider 20 end, of the suspension 10, in turn causing unwanted cross-track motion of the slider. This modulates the transducer and its associated read/write gap. In curve 14b, with micro-stiffening, this peak is significantly reduced in amplitude to around 30 micro-inches. There is a slight frequency shift of approximately 30 Hz between the peak of curve 14a, without micro-stiffening, and 14b, with micro-stiffening. However, this shift is negligible given the associated reduction in resonant amplitude.

FIG. 15 shows another frequency response function of a reverse rib suspension both with and without micro-stiffening added. The plot is of frequency versus the height out of the plane of the disk at the slider end of the suspension. The measurement was taken at the reinforcement rib, adjacent to the point where the slider 20 is attached. Excitation is applied at the base 60 in the lateral direction. Curve 15a represents the suspension without micro-stiffening while curve 15b represents the suspension with micro-stiffening. In curve 15a, without micro-stiffening, there is a significant peak of approximately 375 micro-inches around 1200 Hz, indicative of excitation of the first torsional mode. Thus, comparing FIGS. 14 and 15 it is seen that the head of the suspension moves over a larger distance than the base, resulting in movement of the slider 20 as described above. On curve 15b, with micro-stiffening, this peak is significantly reduced to around 25 micro-inches. Again, there is only a slight frequency shift of approximately 30 Hz between the peak of curve 14a, without micro-stiffening, and 14b, with micro-stiffening.

FIG. 16 shows another frequency response function of a standard reverse rib suspension both with and without micro-stiffening added. This plot is of frequency versus the lateral displacement, in the plane of the disk, of the magnetic head slider 20. Curve 16a represents the suspension without micro-stiffening while the curve 16b represents the suspension with micro-stiffening. On curve 16a, without micro-stiffening, there is a significant peak of approximately 40 micro-inches around 1200 Hz, corresponding to excitation of the first torsional mode. A typical high density track is 1000 micro-inches wide. Lateral motion from the center of the track of approximately 28 micro-inches is enough to cause cross-track errors and instigate control system instabilities. On curve 16b, with micro-stiffening, this peak is materially reduced to approximately 2 micro-inchs, thus significantly reducing the potential for cross-track errors. Thus, FIGS. 14, 15, and 16 show that with micro-stiffening the amplitude of resonant oscillation is decreased without substantially changing the frequency of the resonant oscillation mode.

The plots of FIGS. 14, 15, and 16 correspond to show that micro-stiffening profoundly reduces the effects of oscillatory vibrations in the suspension and magnetic head of a disk drive. Comparing FIG. 14 and FIG. 15 it is apparent that oscillation more greatly affects the suspension and magnetic head at the head end of the suspension, i.e., the amplitude of oscillation is greater near the transducer. As previously explained, the gap in the transducer must be kept as close as possible to the disk at a constant height for optimal high density recording. Thus, the movement of the head end of an undamped suspension must be controlled. The frequency response function curves 14b, 15b, and 16b show that adding micro-stiffening at or near the point of origin of the suspension resonant oscillations reduces the amplitude of vibration at the formed area of the suspension in the direction normal to the plane of the suspension. This in turn, substantially reduces vibration at the head of the suspension both lateral and normal to the plane of the suspension. Also, cross-track error is significantly reduced with micro-stiffening, since the resonant vibration is no longer able to traverse the length of the suspension and affect the slider. Hence, micro-stiffening increases the performance of the disk drive. Ultimately, a micro-stiffened suspension is relatively insensitive at the head end to excitation inputs at the base of the suspension.

Figure 17:
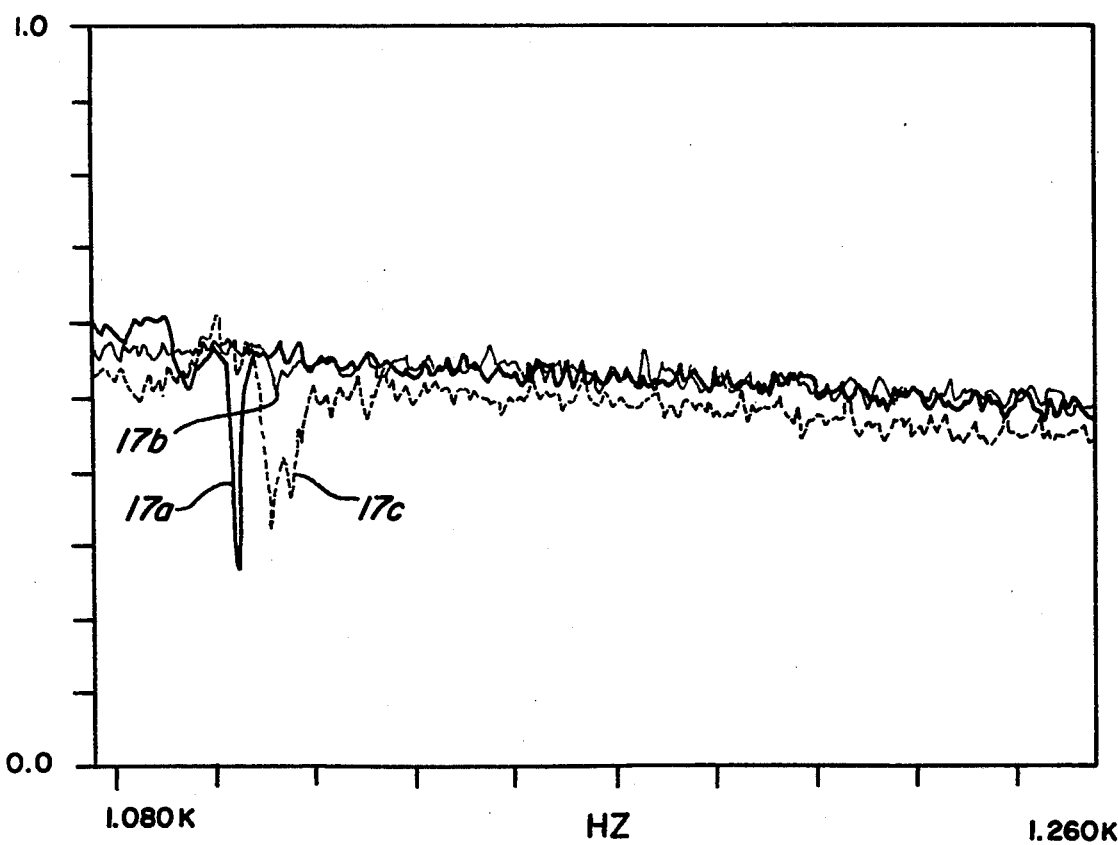
FIG. 17 shows the frequency response function of a suspension with the suspension support arm mounted at a range of z-heights above the disk, illustrating that micro-stiffening is a viable technique for removing resonant oscillation in situ, given varying suspension mounting plane to disk spacing.

This insensitivity to resonant oscillation is effective over a range of z-heights, or the distance between the suspension mounting plane and the disk. This range is typically ±0.005 inches from the nominal z-height designated for the drive. However, this value may be as much as ±0.01 inches if the suspension is micro-stiffened as illustrated in FIG. 12. FIG. 17 shows a series of frequency response functions resulting from a micro-stiffened suspension mounted at various z-heights. For each of these curves, the output is normalized to the input. Curve 17a starts with the welded area at 0.065 inches above the disk. Curve 17b has z-height of 0.060 inches. Curve 17c has z-height of 0.055 inches. In FIG. 17, the peaks in each response curve represent either the first torsional mode or first bending mode. Curve 17b with 0.060 inch z-height is almost flat, suggesting that at this z-height the effects of resonant oscillation are almost eliminated. However, over a ±0.005 inch range, the response curve stays relatively flat, showing that the effects of resonant oscillation are clearly reduced over a broad range of z-heights.

FIG. 17, curves a through c, illustrate that micro-stiffening is effective over a broad range of z-heights. Thus, the frequency response function of a suspension mounted at a particular z-height can be studied to ascertain whether or not the suspension is mounted correctly. If the frequency response curve is relatively flat, the suspension with micro-stiffening will perform without resonant vibration, relatively unaffected by how it is mounted. If the frequency response curve is highly peaked, the suspension is mounted beyond the geometrical tolerance of the particular design of micro-stiffening. This is of great value in determining whether the drive will perform satisfactorily after the suspension is installed.

Micro-stiffening not only reduces the amplitude of resonant vibration in a disk drive, it introduces a determination of whether or not the suspension is correctly mounted in the drive. Micro-stiffening furnishes great control over which frequencies will be allowed to propagate along the suspension. By adding the micro-stiffening at the origin of a resonant oscillation, the amplitude of oscillation is reduced before it propagates to the head, deleteriously vibrating the transducer. Thus, with micro-stiffening, control over the amplitude of resonant frequencies can be obtained. Therefore, the servo-control system need not be reduced in performance at the frequencies where micro-stiffening has reduced the amplitude of resonant oscillation. Micro-stiffening increases the repeatability of the dynamic response of the suspension, i.e., location and amplitude of the resonant peaks do not vary as a function of manufacturing as is usually the case with a standard suspension. Micro-stiffening allows the suspension to be more easily reproduced and more accurately mounted, while reducing the effects of resonant vibration.

One skilled in the art will recognize that micro-stiffening can be applied to manufactured devices other than magnetic head suspensions. Additionally, micro-stiffening can be employed in other metals, and further, materials other than metal, including plastics, fiberglass, and composite materials. Thus, micro-stiffening is a practical technique for reducing the amplitude of resonant vibrations in a variety of devices.

What is claimed:

1. A magnetic head suspension assembly comprising:
   an axially elongate suspension having a first area of a first stiffness and a second area of a second stiffness, said first area having a top surface and a bottom surface, said second stiffness being stiffer than said first stiffness;
   an interface region which connects said first area to said second area; and
   at least one micro-deformation in said first area, said micro-deformation having a height above or below the top or bottom surface of said first area selected to reduce the amplitude of resonant oscillation of said first area without significantly shifting the frequency of resonant oscillation of said first area.

2. A magnetic head suspension assembly as defined in claim 1, wherein said micro-deformation comprises plastic deformation of a localized region of said suspension assembly.

3. A magnetic head suspension assembly as defined in claim 1, wherein said micro-deformation is sized and configured not to appreciably affect the spring constant of said first area.

4. A magnetic head suspension assembly as defined in claim 3, wherein said micro-deformation comprises a crease which has a component along a longitudinal axis of said suspension.

5. A magnetic head suspension assembly as defined in claim 4, wherein said crease comprises a plastic deformation of said first area.

6. A magnetic head suspension assembly as defined in claim 3, wherein said micro-deformation comprises a ridge which has a component along a longitudinal axis of said suspension.

7. A magnetic head suspension assembly as defined in claim 6, wherein said ridge is formed elastically in said first area.

8. A magnetic head suspension assembly as defined in claim 3, wherein said micro-deformation comprises a crimp along an edge of said first area.

9. A magnetic head suspension assembly as defined in claim 3, wherein said micro-deformation comprises a dimple having a component along a longitudinal axis of said suspension.

10. A magnetic head suspension assembly as defined in claim 3, wherein said micro-deformation comprises a shot peen positioned along a longitudinal axis of said suspension.

11. A magnetic head suspension assembly as defined in claim 3, wherein said micro-deformation comprises a flap comprising at lease one crease and at least one fold.

12. A magnetic head assembly as defined in claim 1, wherein said micro-deformation extends into said interface region.

13. A magnetic head suspension assembly as defined in claim 12, wherein said micro-deformation has a component along a longitudinal axis of said suspension.

14. A magnetic head suspension assembly as defined in claim 1, wherein said second area includes a longitudinal micro-deformation, a lateral micro-deformation and a diagonal micro-deformation.

15. The magnetic head suspension assembly of claim 1,
wherein said micro-deformation has a height such that the ratio of its height to the amplitude of oscillation at the natural frequency of said first area of said suspension is on the order of 10.

16. A magnetic head suspension assembly as defined in claim 15, wherein said micro-deformation is formed in said first area.

17. A magnetic head suspension assembly as defined in claim 16, wherein said micro-deformation comprises a flap formed by at least one crease and at least one fold.

18. A magnetic head suspension assembly comprising:
a formed area;
a load beam having a longitudinal micro-deformation, a lateral micro-deformation and a diagonal micro-deformation;
an interface region which connects said formed area to said load beam, said formed area being significantly more flexible than said load beam;
a micro-deformation formed in said interface region and a longitudinal micro-deformation formed in said formed area, said micro-deformation in said formed area having a height such that the ratio of its height to the amplitude of oscillation at the natural frequency of said formed area of said suspension is about 10.

19. A magnetic head suspension assembly as defined in claim 18, wherein said longitudinal micro-deformation in said formed area comprises a flap along an edge of said formed area.

* * * * *